United States Patent [19]

Shimizu et al.

[11] Patent Number: 4,651,073
[45] Date of Patent: Mar. 17, 1987

[54] POSITIONING CONTROL DEVICE FOR AN ELECTRIC MOTOR

[75] Inventors: Wataru Shimizu; Yasuhiro Yuasa, both of Tokyo, Japan

[73] Assignee: Kabushiki Kaisha SG, Tokyo, Japan

[21] Appl. No.: 774,396

[22] Filed: Sep. 10, 1985

Related U.S. Application Data

[63] Continuation of Ser. No. 640,501, Aug. 13, 1984, abandoned.

[30] Foreign Application Priority Data

Aug. 22, 1983 [JP] Japan .................. 58-151583

[51] Int. Cl.$^4$ .......................... G05D 23/275
[52] U.S. Cl. ................. 318/632; 318/611; 318/758; 318/369
[58] Field of Search ............. 318/632, 611, 612, 757, 318/758, 759, 760, 761–764, 366, 369

[56] References Cited

U.S. PATENT DOCUMENTS

| | | | |
|---|---|---|---|
| 3,555,254 | 1/1971 | Gerber | 318/632 |
| 3,906,315 | 1/1974 | Gotisar | 318/761 |
| 3,917,930 | 11/1975 | Davey | 318/561 |
| 4,139,811 | 2/1979 | Klinger | 318/611 |
| 4,451,769 | 5/1984 | Minnich et al. | 318/611 X |
| 4,486,692 | 12/1984 | Sonada et al. | 318/763 X |
| 4,499,546 | 2/1985 | Kuga et al. | 318/632 |
| 4,558,265 | 12/1985 | Hayashida et al. | 318/561 |

Primary Examiner—Benjamin Dobeck
Attorney, Agent, or Firm—Spensley Horn Jubas & Lubitz

[57] ABSTRACT

A rotational position, velocity and acceleration of an electrical motor are detected and an amount of overrun produced when the motor has stopped is estimated from the detected velocity and acceleration, and at least one of motor position detection data and a positioning target value is changed in accordance with the estimated amount of overrun. The position detection data and the positioning target value after the change are compared with each other and a command for stopping the motor is generated in accordance with a result of this comparison. A brake is applied to the motor in advance by the amount of the estimated overrun so that the motor is stopped at a desired target position after making overrun. Further, velocity setting signals are generated in accordance with desired acceleration and deceleration characteristics and the velocity control of the motor is effected in an open loop in response to the velocity setting signals. By the stop and velocity controls of an open loop system, positioning control of the motor of the open loop system can be accurately performed.

21 Claims, 5 Drawing Figures

POSITIONING CONTROL DEVICE FOR AN ELECTRIC MOTOR

This application is a continuation of Ser. No. 640,501, filed Aug. 13, 1984, now abandoned.

BACKGROUND OF THE INVENTION

This invention relates to a positioning control device for an electric motor such as an AC motor, DC motor or stepping motor and, more particularly, to a device capable of positioning controlling a high accuracy electric motor in an open loop system.

An AC motor of a relatively low cost such as a squirrel-cage motor or a pole change motor has heretofore been used in a constant velocity driving and rarely used for such a high class control such as a variable velocity control or a positioning control. Presently, however, variable velocity control of an induction motor has become feasible by the employment of an inverter control. A technique of stopping a motor at a desired rotation angle by actuation of a brake provided on the motor has also been adopted with a result that the range of application of the motors has been broadened.

It is experienced that application of a brake does not cause a rotation shaft of a motor to be stopped immediately but overrunning more or less occurs. The prior art control device has not given sufficient consideration to the prevention of overrun. What the prior art device has been able to do is at best to apply brake at a position which is a certain distance before a desired stop position on the assumption that an overrun amount is constant. In actuality, however, the overrun amount differs depending upon the velocity of rotation of the motor and also upon acceleration. Particularly in a positioning-control required in such a case as the motor must be stopped immediately after starting of its operation, influence of the acceleration of rotation over the overrun amount is great. For effecting an accurate positioning-control in an AC motor with a brake system, therefore, the brake control must be made taking into account the overrun amount corresponding to the velocity and acceleration.

In the inverter control, an acceleration control can virtually be realized by variably setting time required for reaching a target velocity (in this specification, the term "acceleration" is used to include also deceleration). In the past, setting of such acceleration has been made only manually by manipulation of a knob. This causes the problem that hunching in the velocity occurs when the set acceleration is not proper. If, for example, deceleration is too fast in changing from the first speed to the second speed, unstable sway in the velocity takes place.

In order to perform positioning of a motor without causing a shock, it is desirable to effect a most appropriate deceleration control. In order to perform a smooth starting of the motor, it is desirable to effect a most appropriate acceleration control. For this purpose, it has been practiced to control the velocity of the motor in accordance with proper acceleration and deceleration patterns. Since, however, the velocity control of the motor in the past has relied on a servo control of a closed loop system, it has the following drawback while it is suited for an accurate positioning. Since the motor is controlled by a drive signal consisting of a small current or voltage, a large loop gain cannot be obtained and it also involves always the problem of occurrence of oscillation or hunting during positioning. Besides, the servo control is costly.

It is, therefore, an object of the invention to provide a positioning control device for an electric motor capable of effecting an accurate positioning by employing a simple and inexpensive open loop system. More specifically, the invention aims at providing a positioning control device capable of effecting an accurate positioning (stopping) simply and inexpensively by the open loop system by taking into account the overrun amount corresponding to the velocity and acceleration of the motor.

It is another object of the invention to provide a positioning control device for an electric motor capable of performing a proper acceleration control by the open loop system.

It is still another object of the invention to provide a positioning control device for an electric motor capable of performing a proper velocity control (particularly deceleration control and acceleration control) by the open loop system and thereby improving the accuracy of positioning by the open loop system.

SUMMARY OF THE INVENTION

For achieving the above described objects, a control is performed such that a rotational position and velocity of an electric motor, and acceleration thereof if required, are respectively detected, an estimated overrun amount is determined taking velocity, or both velocity and acceleration, into account, at least either present rotational position detection data or positioning target value is changed so that compensation according to the determined estimated overrun amount is made and the electric motor is stopped in accordance with comparison of the changed (compensated) position data with the target value. The stop control is performed by actuation of a brake. More specifically, the brake is applied before the target value in accordance with the estimated overrun amount to produce an overrun according to the estimation and thereby to position the motor accurately in accordance with the target value. In motors such as a stepping motor and a pulse motor in which the rotation shaft can be locked without a brake, the positioning control according to the invention can be performed without using a brake. According to the invention, by taking into account both velocity and acceleration, the overrun amount can be precisely estimated even when the velocity and acceleration undergo transient change e.g., during the starting time, whereby an accurate positioning control can be effected.

It is conceivable that the relation between velocity or acceleration and an actual overrun amount changes due to change in the load conditions of the motor, wear of the mechanical system caused by aging and other factors. In that case, the above described construction alone will not be able to effect an accurate positioning control. In view of this problem, according to the present invention, an error between an actual stop position and the target value is memorized each time upon completion of positioning and, in the next positioning control, the estimated overrun amount or the present position data or the target value is corrected employing the newest error, and the positioning control is performed by utilizing this corrected value. This further improves the accuracy of positioning.

Further, according to the present invention, there is provided deceleration control means for generating a velocity setting signal following a predetermined deceleration pattern as a function of the present position of the electric motor, and the velocity of the motor is decreased according to the open system by this velocity setting signal. For example, this deceleration pattern consists of a deceleration curve portion in which the velocity gradually decreases from a predetermined high speed to a predetermined low speed in a section between a deceleration start position and a low speed start position and a low speed sustain portion in which the predetermined low speed is maintained in a section between the low speed start position and a stop position. The deceleration start position, the low speed start position, the predetermined high speed (the highest speed) and the predetermined low speed (the lowest speed) can be set as desired. By such deceleration control of the open loop system, a stop control with little shock and accuracy in stopping can be realized in the positioning control of the open loop system.

Furthermore, according to the invention, there is provided acceleration control means for generating a velocity setting signal according to which the velocity increases up to a predetermined highest speed in accordance with a predetermined acceleration pattern at the start of the electric motor and the velocity of the motor is accelerated in the open loop system by this velocity setting signal. A smooth start of the motor thereby can be realized. Since the above described acceleration and deceleration controls are performed in the open loop system, the expensive servo control becomes unnecessary. Further, a loop gain can be increased if necessary whereby time required for the positioning control can be reduced.

Preferred embodiments of the invention will now be described in more detail with reference to the accompanying drawings.

BRIEF DESCRIPTION OF THE DRAWINGS

In the accompanying drawings.

DESCRIPTION OF PREFERRED EMBODIMENTS

Figure 1:
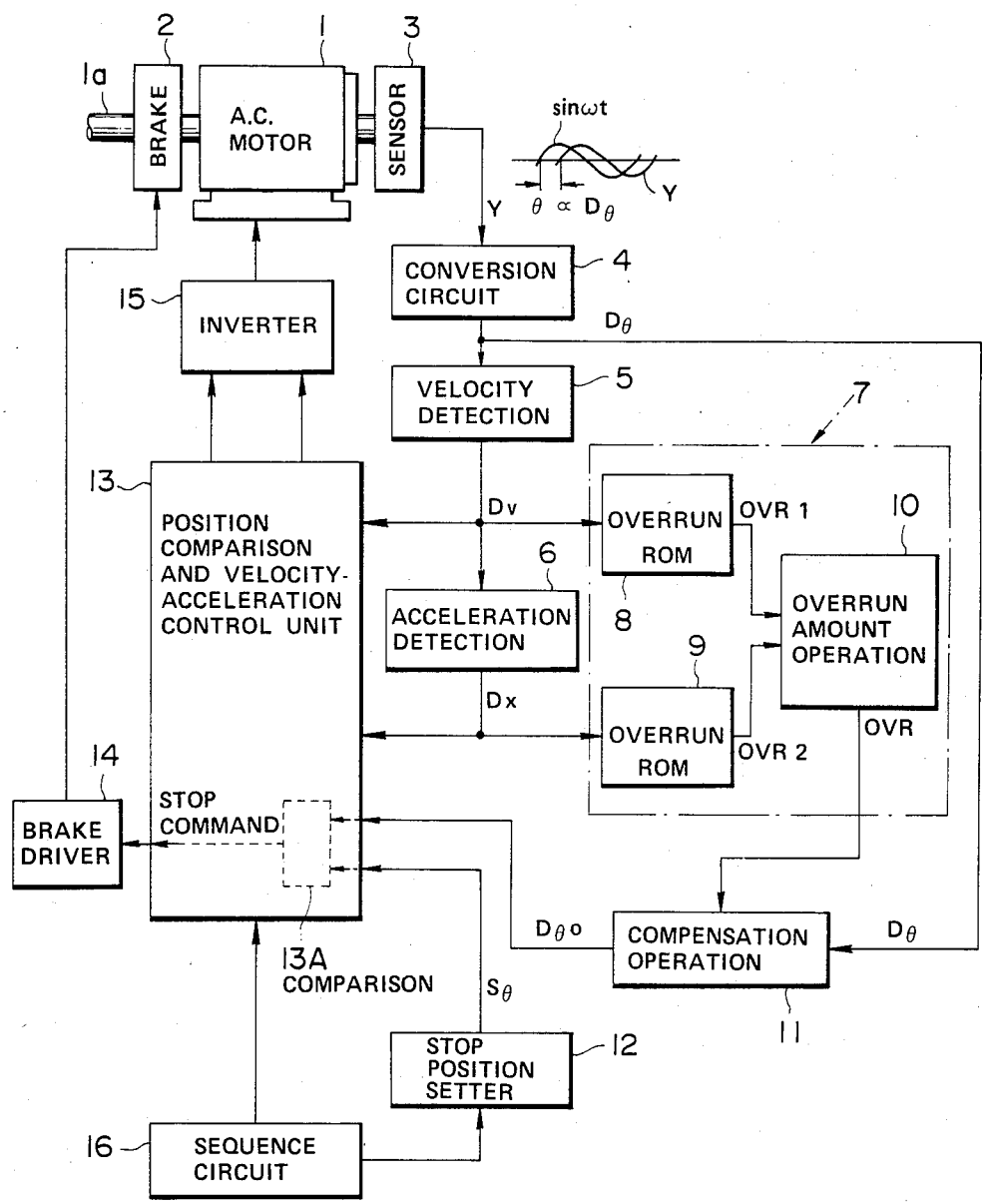
FIG. 1 is an electrical block diagram showing an embodiment of the invention.

Referring to FIG. 1, an AC motor 1 consists, for example, of a squirrel-cage induction motor. A brake 2 is secured to a rotation shaft 1a of the motor 1. A rotational position sensor 3 is provided for detecting a rotational position (angle) of the rotation shaft 1a of the motor 1. In this embodiment, a phase shift type variable reluctance rotational position sensor such as disclosed in Japanese Patent Preliminary Publication No. 70406/1982 (corresponding, to U.S. patent application Ser. No. 311,277 and West German Patent Application No. P3141015.4) is employed as the rotational position sensor 3. The rotational position sensor 3 indicates variation in reluctance responsive to the position of the rotation shaft 1a and produces, in response to this reluctance, an output signal $Y = \sin(\omega t - \theta)$ which is phase-shifted from a reference AC signal $\sin \omega t$ by an electrical phase angle $\theta$ corresponding to the present position of the rotation shaft 1a. A conversion circuit 4 receives the output signal Y of the sensor 3, measures the electrical phase-shift amount $\theta$ and delivers out a result of the measurement as present rotational position data $D_\theta$ of the motor 1.

While this rotational position data $D_\theta$ represents the rotational position of the motor 1 in an absolute value, it includes not only the rotational position in one rotation but also a higher position information corresponding to the number of rotation from an origin of a mechanical system driven by the motor 1. In a case where the sensor 3 is capable of detecting only the position in one rotation in an absolute value, the higher position information, i.e., rotation number data, is obtained by providing a counter performing 1 count each time one rotation is completed within the conversion circuit 4, and rotational position data $D_\theta$ ranging over multiple rotations is obtained by combining this data with the rotational position data in one rotation, as the sensor 3, an absolute rotational position sensor of a mulitple rotation type such as disclosed in Japanese Patent Preliminary Publication No. 106691/1983 (corresponding to U.S. patent application Ser. No. 450,634 and West German Patent Application No. P3246959.4) may be employed. In this case, the counter for counting the number of rotations is unnecessary and absolute position data $D_\theta$ ranging over multiple rotations can be directly obtained.

For detecting the velocity and acceleration of the rotation shaft 1a, velocity and acceleration detection circuits 5 and 6 are provided. In this embodiment, no special sensors for detecting the velocity and acceleration are provided but the velocity is detected by utilizing the rotational position detection data $D_\theta$ and the acceleration is detected by utilizing velocity data Dv of the detected velocity. For this purpose, the position data $D_\theta$ is applied to the velocity detection circuit 5 and the velocity data Dv delivered from the velocity detection circuit 5 is applied to the acceleration detection circuit 6.

When the motor 1 is at a standstill at a desired position, the position data $D_\theta$ maintains a value representing this position and no change is brought about. When the motor 1 is moving at a certain velocity, the value of the position data $D_\theta$ changes with time in response to the change of the rotational position. Accordingly, velocity data Dv can be obtained by operating the amount of change of the position data $D_\theta$ per predetermined unit time (or unit period) in the velocity detection circuit 5. Likewise, acceleration data Dx can be obtained by operating the amount of the velocity data Dv per predetermined unit time (or unit period) in the acceleration detection circuit 6.

An overrun amount estimation circuit 7 determines an estimated overrun amount on the basis of the detected velocity data Dv and acceleration data Dx. The circuit 7 consists, for example, of overrun ROMs (or RAMs) 8 and 9 and an overrun amount operation circuit 10. An overun ROM 8 prestores the amounts of overrun corresponding to various velocity values. Similarly, an overrun ROM 9 prestores the amounts of overrun corresponding to various acceleration values. ROM herein means a read-only memory and RAM a random-access memory. The "amount of overrun" means a distance between a position at which the brake 2 starts its operation and a position at which the motor 1 actually stops. The amounts of overrun are previously measured (learned) in correspondence to various velocity and acceleration values and stored in the ROM's (or RAM's) 8 and 9.

Overrun amount data OVR1 and OVR2 are respectively read from the ROM 8 and 9 in response to the present velocity data Dv and the present acceleration data Dx, and are supplied to an overrun amount operation circuit 10. The overrun amount operation circuit 10 provides, by a series of operation including computation, selection and mixing, data OVR estimating an actual overrun amount using expected overrun amount data OVR1 corresponding to the present velocity and expected overrun amount data OVR2 corresponding to the present acceleration as parameters. For example, the operation circuit 10 determines the overrun amount dependent substantially upon acceleration (including velocity element to some extent) if there is acceleration and, in a constant velocity section, determines the overrun amount substantially in response to the velocity then available. For another example, mixture of the data OVR2 corresponding to acceleration and the data OVR1 corresponding to velocity at a predetermined ratio corresponding to the degree of acceleration may be provided as the data OVR. For further example, data of a large value between the data OVR1 corresponding to velocity and the data OVR2 corresponding to acceleration may be selected as the data OVR.

A compensation operation circuit 11 increases or decreases the value of the position data $D_\theta$ in accordance with the estimated overrun amount data OVR to change the value to a value $D_{\theta 0}$ which has been compensated for the estimated overrun amount. A stop position setter 12 is provided for setting a stop position, i.e., a positioning target value. The setter 12 produces target value data $S_\theta$ representing a rotational position at which the motor is to be stopped.

A position comparison and velocity-acceleration control unit 13 supplies a brake driver 14 with a brake actuation signal and also supplies an inverter (i.e., a DC/AC converter) 15 for controlling the AC motor 1 with a DC velocity setting signal and DC acceleration setting signal. This unit 13 includes comparison means 13A which compares the rotational position data $D_{\theta 0}$ having compensated the overrun amount and supplied from the compensation operation circuit 11 with the target data $S_\theta$ which has been set in the setter 12. The control operation of the unit 13, including this comparison operation, is controlled by a sequence circuit 16 in accordance with an entire sequence operation of the AC motor 1. Sequence information is supplied also to the stop position setter 12 from the sequence circuit 16 to control change of the stop target position or output timing of the data $S_\theta$ in accordance with the sequence operation. The output of the comparison means 13A is supplied to the brake driver 14 so that the brake operation is controlled in accordance with the comparison.

Assume, for example, that the stop position target value $S_\theta$ is 50° at the n-th rotation counted from the origin and the estimated overrun amount OVR determined by velocity and acceleration is plus 375 when the present position data $D_\theta$ has reached 35° at the n−1-th rotation. The position data $D_{\theta 0}$ having compensated the overrun amount then becomes 50° at the n-th rotation and the comparison means 13A thereupon produces a coincidence output. The brake 2 is actuated by the brake driver 14 in response to this coincidence output. An overrun by about 15° from this brake timing is produced so that the motor 1 is stopped at the desired rotational position at 50°. The stop control is not limited to the one made by the brake 2 but it may also be made by the inverter 15 (i.e., reducing the velocity setting signal and the acceleration setting signal to zero).

In the above described embodiment, the present position data $D_\theta$ is changed by the compensation circuit 11. Alternatively, the target value $S_\theta$ may be compensated by an increasing or decreasing control (e.g., decreasing the target value by the estimated overrun amount). Alternatively further, the present position data $D_\theta$ and the target value $S_\theta$ may both be compensated by proper amounts respectively to obtain an equivalent overrun compensation effect.

The velocity data Dv and the acceleration data Dx which have been detected in the velocity detection circuit 5 and the acceleration detection circuit 6 are applied to the control unit 13 to enable the unit 13 to control the velocity setting signal and the acceleration setting signal to be supplied to the inverter 15 by utilizing these detected values. The unit 13 can always watch change in the acceleration data Dx closely and control the acceleration setting signal so that acceleration will not exceed a predetermined value. This arrangement is quite effective for the shockless control of the motor 1. It has been experienced in the past that an abrupt change in the load to the motor 1 entails an abrupt increase in the acceleration of rotation causing a strong mechanical shock to be applied to the motor 1. By performing the above described acceleration control, such abrupt change in acceleration can be coped with in real time thereby enabling the shockless control.

Relationship between the velocity and acceleration and the actual amount of overrun may become different from the one stored in the overrun ROM's (or RAM's) 8 and 9 due to change in the load of the motor 1, aging or other reasons. If the contents of storage in the overrun ROM's 8 and 9 come to include error, it will become difficult to perform an accurate positioning control by the above described construction alone. This problem can be overcome by memorizing each time an error between the actual stop position determined according to the invention and the set position (target position) at that time, modifying the target value $S_\theta$ (or the estimated overrun amount OVR, OVR1, OVR2, $D_{\theta 0}$) by using a newest one of such error in a next positioning control, and effecting the comparison operation by using the modified data. Such modification may be realized by modifying a part of the embodiment of FIG. 1 as shown in FIG. 2.

Figure 2:
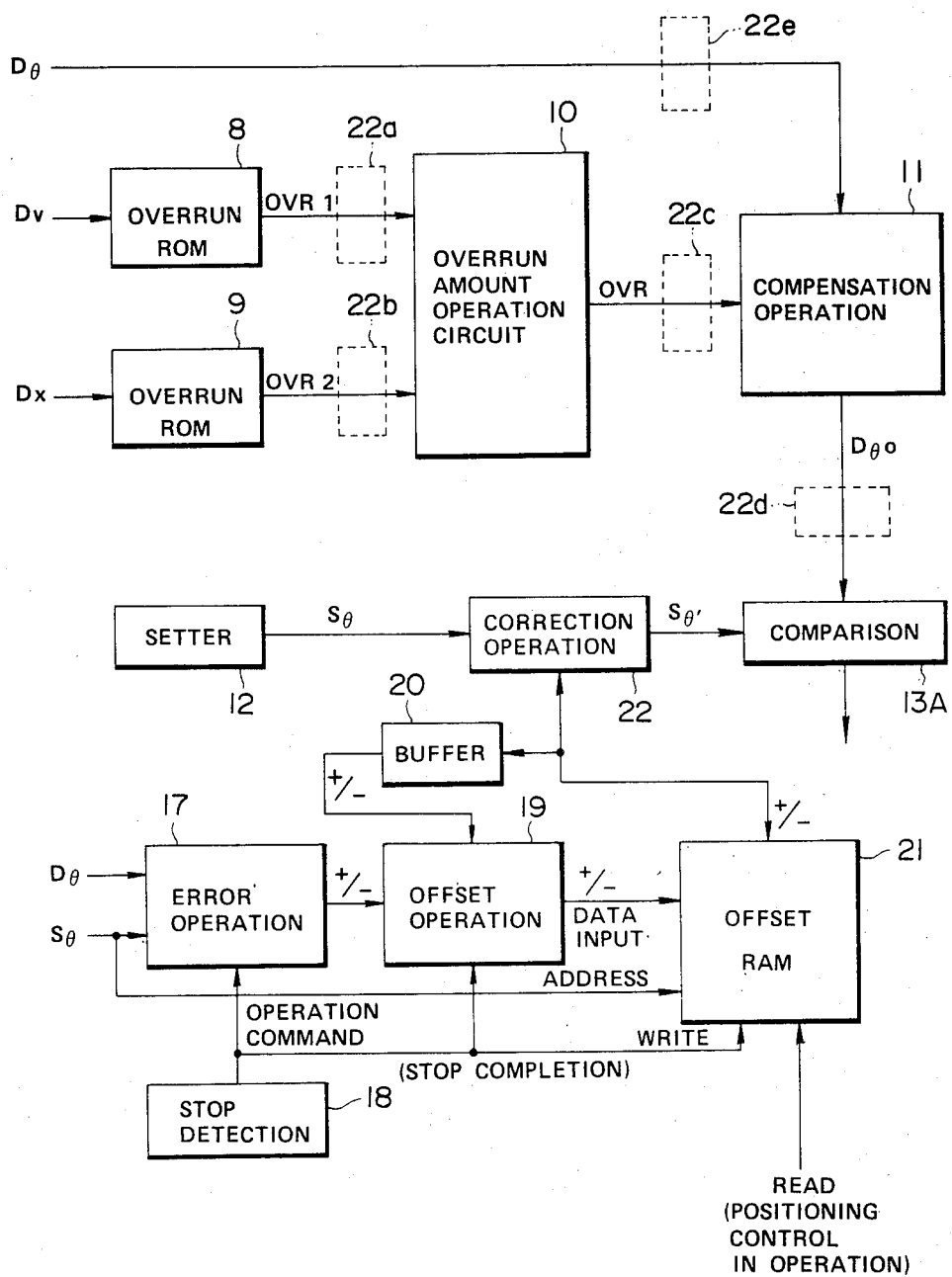
FIG. 2 is an electrical block diagram showing another embodiment of the invention with respect only to a modified portion in the embodiment of FIG. 1.

In FIG. 2, an error operation circuit 17 compares the actual stop position (represented by $D_\theta$) which has been position-controlled with the stop position set value $S_\theta$ when the motor 1 has come to a complete standstill after the stop control (i.e., brake control) and thereby obtains an error between them with a positive or negative sign affixed thereto. A stop detection circuit 18 detects the complete stopping of the rotation shaft 21 which has so far been moving and thereupon provides the error operation circuit 17 with an operation command. This detection can be made in a suitable manner, e.g., on the basis of reduction of the velocity data Dv to zero or lapse of a certain period of time after the start of operation of the brake 2. The error operation on the circuit 17 operates difference between the present position data $D_\theta$ and the set value $S\theta$ in response to the operation command and supplies the result of the operation as error data to one input of an offset operation circuit 19. To another input of the offset operation circuit 19 is applied, through a buffer register 20, offset data (with a positive or negative sign) used in the stop positioning control which has been just implemented. The offset operation circuit 19 increases or decreases the value of this offset data in response to the value of the error data from the circuit 17. The operation circuit 19 is enabled to conduct the operation, similarly to the operation circuit 17, by an operation command from the circuit 18. The offset data provided by the offset operation circuit 19 is applied to a data input of a RAM (a memory capable of both reading and writing) 21. An address input of the RAM 21 receives the set value (target value) $S_{74}$ and a write command input of the RAM 21 receives the same data as the operation command given from the stop detection circuit 18 to the circuits 17 and 19. Accordingly, the offset data relating to the error between the actual stop position and the set position obtained by the circuit 34 at the completion of the stop positioning is loaded in the address corresponding to the set position in the RAM 21. If the positioning is accurate, the error data provided by the operation circuit 17 is zero so that the offset data provided by the operation circuit 19 to the RAM 21 is the same as the one provided by the buffer 20. If there is an error in the positioning, the output error data of the circuit 17 has a positive or negative value corresponding to this error and the value of the old offset data from the buffer 20 is changed (increased or decreased) according to the error data.

The buffer register 20 temporarily stores the offset data read from the RAM 21. This storage is held until at least the error and offset operations in the operation circuits 17 and 19 have been completed.

The RAM 21 is adapted to be in a read-out mode during the positioning control and a read-out command is given by a suitable circuit, e.g., the sequence circuit 16 during the positioning control. Accordingly, the offset data is read from the address corresponding to the target position $S_\theta$ which has been set in the positioning control under operation. The offset data thus read out is one which has been obtained and stored in the above described manner in response to the result of the last positioning with respect to the target set position of the same value as the presently applied target set position $S_\theta$. It is therefore the best offset data that reflects the present load condition or operation condition of the motor 1 to the maximum extent possible. Thus, the offset data which has been read from the RAM 21 signifies a great possibility that an error which is of the same or nearly same value as this offset data will be produced between the set position $S_\theta$ and the actual stop position if an additional compensation (advancing or delaying the position data $D_\theta$) corresponding to this offset data is not conducted in the present positioning control.

A correction operation circuit 22 is provided on the output side of the stop position setter 12. During the positioning control, the circuit 22 corrects the circuit stop position target value $S_\theta$ in response to the newest offset data supplied from the RAM 21 and delivers a corrected stop position target value $S_\theta'$ to the comparison means 13A. This correction operation is effected, for example, by adding or subtracting the newest offset data from the RAM 21 to or from the stop position target value $S_\theta$ from the setter 12. As described in the foregoing, the offset data stored in the RAM 21 is an error obtained by the newest positioning control and, accordingly, if correction of this error is not made in the present control, the same amount of error is likely to be produced again. Therefore, an accurate positioning control cancelling an estimated error can be realized by changing the target value $S_\theta$ in response to this offset data and comparing the changed target value $S_\theta'$ with the position data $D_{\theta 0}$.

The same function and effect as the effect as the embodiment described above will be obtained by inserting the correction operation circuit 22 at locations indicated by blocks 22a–22e in broken lines to correct the estimated overrun amount OVR or the position data $D_\theta$ and $D_{\theta 0}$.

Figure 3:
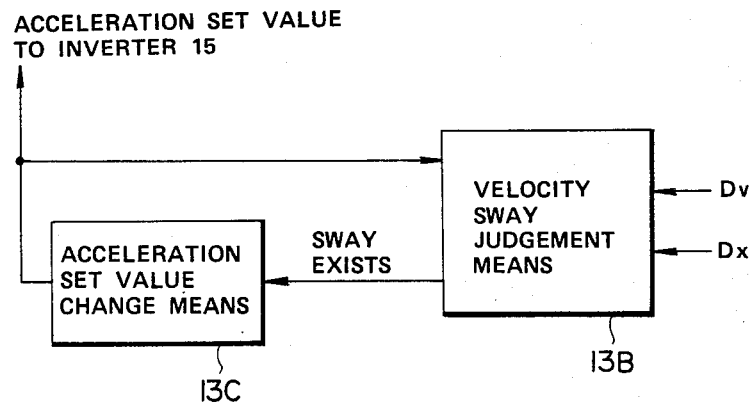
FIG. 3 is an electrical block diagram showing an essential portion of still another embodiment of the invention in which a circuit for the acceleration control included in the position comparison and velocity-acceleration control unit is illustrated.

If a set value of acceleration (or deceleration) supplied to the inverter 15 during the acceleration or deceleration time is too large, hunting occurs in the actual motor velocity, which is quite undesirable. In relation to the brake control, such phenomenon occurs in such a case as when the motor 1 is decelerated before brake is applied such phenomenon also occurs when an abrupt acceleration is made despite a large mechanical load imposed on the motor 1. As shown in FIG. 3, for eliminating such hunting in the velocity (sway), velocity sway judgement means 13B and acceleration set value change means 13C may preferably be provided in the velocity-acceleration control unit 13. The velocity sway judgement means 13B judges whether or not sway exists in the velocity during the acceleration or deceleration time on the basis of the velocity detection data or acceleration detection data and in accordance with predetermined conditions of judgement. When it has been judged that there is sway in the velocity, the acceleration set value change means 13C changes the set acceleration value of the motor 1 in a direction in which the sway is eliminated (i.e., in a direction in which acceleration or deceleration is controlled). Data of the acceleration set value is supplied to the inverter 15 to change time required for reaching the target velocity. Such acceleration control is made not by a real time closed loop control but by a virtual open loop control. More specifically, presence or absence of sway is judged by the judgement means 13B during a certain acceleration or deceleration time and, if it has been judged that there is no sway, acceleration at that time is proper and the acceleration set value is not changed. If it has been judged that there is a sway, the acceleration set value is changed (switched) and the inverter 15 is operated and the motor 1 is controlled in accordance with the changed acceleration in the control.

Figure 4:
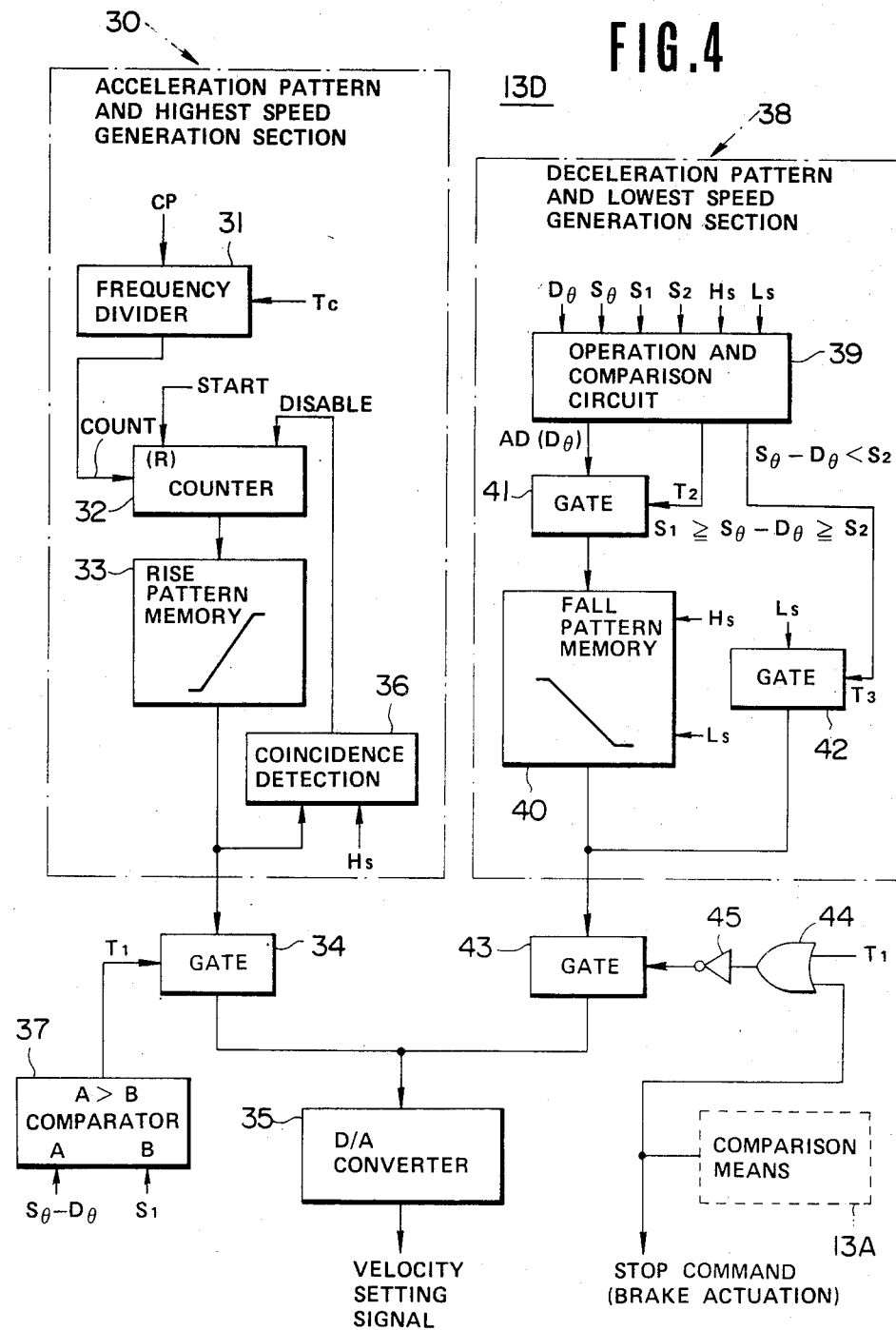
FIG. 4 is an electrical block diagram showing still another embodiment of the invention in which a circuit for the velocity control included in the position comparison and velocity-acceleration control unit is illustrated.

In the control unit 13, a velocity control device 13D of an open loop system as shown in FIG. 4 may be provided. This velocity control device 13D generates a velocity setting signal according to a pattern as shown in FIG. 5 and realizes a smooth starting and a shockless positioning control by controlling the velocity of the motor 1 in accordance with such velocity pattern.

The velocity pattern shown in FIG. 5 will now be described. The velocity increases along a predetermined acceleration curve from starting to the highest speed and, upon reaching the highest speed, the highest speed is sustained. The velocity then decreases along a predetermined deceleration curve from the highest speed to the lowest speed in a section from a deceleration start position to a low speed start position. In a section from the low speed start position to a stop position, a predetermined lowest speed is sustained. The highest speed and the lowest speed can be respectively set at desired values, highest speed setting data being denoted by Hs and lowest speed setting data by Ls. It should be noted that the lowest speed does not mean speed zero. The stop position, deceleration start position and low speed start position also can be set at desired values. The stop position setting data corresponds to the above described target value $S_\theta$. The deceleration start position setting data is denoted by $S_1$ and the low speed start position setting data by $S_2$. For example, $S_1$ is set by distance from a desired deceleration start position to the stop position $S_\theta$ and $S_2$ is set by distance from a desired low speed start position to the stop position $S_\theta$. Characteristics of the acceleration and deceleration curves need not be linear but may be set as a desired curve.

In the example shown in FIG. 4, the acceleration curve is generated as a function of time so that its characteristics can be changed by controlling a time constant. On the other hand, the deceleration curve is generated as a function of the position of the motor 1. It is possible to modify the acceleration curve so that it will be generated as a function of the position of the motor 1.

Figure 5:
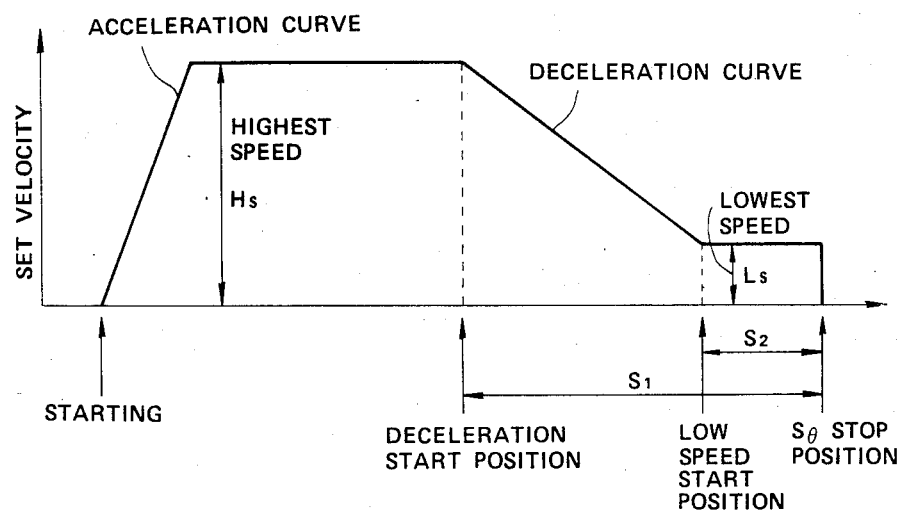
FIG. 5 is a graph showing an example of a velocity setting pattern in the open loop realized by the circuit shown in FIG. 4.

In FIG. 4, an acceleration pattern and highest speed generation section 30 generates the velocity setting signal for the acceleration time and the velocity setting signal for the highest speed in accordance with the characteristics as shown in FIG. 5. The section 30 is supplied with time constant setting data Tc for controlling the time constant of the acceleration curve. A frequency divider 31 frequency-divides a predetermined clock pulse CP at a frequency ratio controlled by the data Tc. The frequency-divided clock pulse is applied to a count input of a counter 32. The counter 32 is reset at the start of the motor 1 and counted up each time a pulse is applied to the count input. The count output of the counter 32 is applied to a rise pattern memory 33 from which velocity setting data consisting of a predetermined rise pattern is read out in accordance with the increase of the count. This velocity setting data is applied to a digital-to-analog converter 35 through a gate 34 and supplied to the inverter 15 (FIG. 1) after being converted to an analog velocity setting signal.

A coincidence detection circuit 36 compares the velocity setting data read from the memory 33 with the highest speed setting data Hs and, when it has detected coincidence, produces a signal prohibiting the counting operation of the counter 32. Accordingly, the velocity setting data read from the memory 33 initially increases gradually in accordance with a predetermined rise characteristic and, upon reaching the set highest speed, maintains the same value as the highest speed setting data Hs. Since the rate of increase of the counter 32 is determined by the frequency of the output pulse of the frequency divider 31, the inclination of the rise characteristics, i.e., time constant, is controlled by the time constant setting data Tc.

A control signal $T_1$ for a gate 34 is provided by a comparator 37. The comparator 37 receives at the A input thereof a difference $S_\theta - D_\theta$ between the stop position setting data $S_\theta$ and the present position data $D_\theta$, receives at the B input thereof deceleration start position setting data $S_1$ and, when A>B, i.e., the present position of the motor 1 has not reached the deceleration start position yet, produces a signal "1" as the control signal $T_1$. Accordingly, the gate 34 is enabled in the section from the start to the deceleration start position in FIG. 5 whereby the velocity setting data having the rise characteristics indicated as the acceleration curve and the subsequent sustaining highest speed setting data pass through the gate 34.

A deceleration pattern and lowest speed generation section 38 generates the velocity setting signal for the deceleration time and the velocity setting signal for the lowest speed in accordance with the characteristics as shown in FIG. 5. An operation and comparison circuit 39 receives the present position data $D_\theta$, the stop position setting data $S_\theta$, the deceleration start position setting data $S_1$, the low speed start position setting data $S_2$, the highest speed setting data Hs and the lowest speed setting data Ls, performs a predetermined operation on the basis of these data and generates an address signal AD ($D_\theta$) for accessing a fall pattern memory 40 as a function of the present position data $D_\theta$. The circuit 39 also judges the condition of comparison $S_1 \geqq S_\theta - D_\theta \geqq S_2$ and, when this is satisfied, i.e., when the present position is somewhere between the deceleration start position and the low speed start position, generates a control signal $T_2$ which enables a gate 41. The address signal AD($D_\theta$) is applied to an address input of a memory 40 through this gate 41. The circuit 38 also judges the condition of comparison $S_\theta - D_\theta < S_2$ and, when this is satisfied, i.e., when the present position has exceeded the low speed start position, generates a control signal $T_3$ which enables a gate 42. The gate 42 receives the lowest speed setting data Ls.

The fall pattern memory 40 stores a predetermined fall pattern whose highest value and lowest value respectively are variably set by the highest speed setting data Hs and the lowest speed setting data Ls. The address signal AD ($D_\theta$) basically changes in response to the change of $D_\theta$ in accordance with the formula $S_1 - (S_\theta - D_\theta)$. When $S_\theta - D_\theta = S_1$, AD($D_\theta$)=0 so that the highest speed setting data Hs is read out. The function of the address signal AD($D_\theta$) is determined depending upon the entire address number (from Hs to Ls) of the memory 40 so that the lowest speed setting data Ls can be read out when $S_\theta - D_\theta = S_2$. Accordingly, velocity setting data which gradually decreases from the highest speed setting data Hs to the lowest speed setting data Ls in the section from the deceleration start position to the low speed start position in accordance with a predetermined fall pattern is read from the memory 40 in response to the address signal AD($D_\theta$) corresponding to the position data $D_\theta$.

The velocity setting data read from the memory 40 is supplied to the digital-to-analog converter 35 through the gate 43.

When the present position has exceeded the low speed start position, the gate 41 is closed and reading of the fall pattern from the memory 40 thereby is completed whereas the gate 42 is enabled to supply the lowest speed setting data Ls continuously to the gate 43, thereby supplying the data Ls to the digital-to-analog converter 35.

The gate 43 receives at its control input the control signal $T_1$ and the output of the comparison means 13A (the brake actuation signal) through an OR gate 44 and inverter 45. Before the present position reaches the deceleration start position, the condition $S_\theta - D_\theta > S_1$ is satisfied and, accordingly, the control signal $T_1$ is "1" so that the gate 34 is enabled and the gate 43 is closed.

After the present position has reached the deceleration start position, however, the condition $S_\theta - D_\theta \leq S_1$ is satisfied and, accordingly, the control signal $T_1$ becomes "0" and the gate 34 thereby is closed. Since the two inputs of the OR gate 44 are both "0", the output of the inverter 45 is turned to "1" and the gate 43 thereby is enabled. Accordingly, the velocity setting data of the deceleration curve and the subsequent lowest speed setting data Ls both read from the memory 40 pass through the gate 43 and supplied to the digital-to-analog converter 35.

When the position data $D_{\theta 0}$ having compensated the overrun amount has been compared with the stop position setting data $S_\theta$ (or $S_\theta'$) in the comparison means 13A and the judgement that the motor 1 should be stopped (i.e., the brake should be applied) has been made, the output signal of the comparison means 13A is turned to "1" which is inverted by an inverter 45 through an OR gate 44 and the gate 43 thereby is closed. Thus, when the brake is applied, the velocity setting signal is simultaneously turned to zero.

Instead of the position data $D_\theta$ and the stop position setting data $S_\theta$ used in FIG. 4, the position data $D_{\theta 0}$ having compensated the overrun amount or the corrected setting data $S_\theta'$ may be employed.

In the above described embodiment, the fall pattern memory 33 is employed. Alternatively, the output of the counter 32 may be directly used as the velocity setting data of the rise characteristics. Further, velocity setting data of the rise characteristics may be generated by an analog constant circuit without using the memory 33.

The present invention can be applied not only to the induction motor but also to a synchronizing motor such as a pole change motor. The invention can also be applied not only to the control of an AC motor but also to the control of a DC motor or a stepping motor. In a motor of a type in which, as a stepping motor, the stop position can be maintained by fixing an excited phase, the invention is applicable without providing a brake.

In the above described embodiments, the control device is constructed of a discrete circuit but it may be constructed by utilizing a microcomputer.

What is claimed is:

1. A positioning control device for an electric motor comprising:
   position detection means for detecting a rotational position of said motor;
   velocity detection means for detecting velocity of rotation of said motor;
   setting means for setting a positioning traget value;
   overrun amount estimation means for determining an estimated amount of overrun by employing the detected velocity;
   compensation means for modifying at least one of the value of position data obtained by said position detection means and the positioning target value in accordance with the estimated amount of overrun determined by said estimation means; and
   comparison means for comparing the position data and the target value after the modification by said compensation means to provide a stop order to said motor in accordance with a result of the comparison.

2. A positioning control device as defined in claim 1 which further comprises acceleration detection means for detecting acceleration of rotation of said motor and wherein said overrun amount estimation means determines the estimated amount of overrun using the detected velocity and acceleration.

3. A positioning control device as defined in claim 2 wherein said motor comprises a brake and said stop order commands applying of this brake.

4. A positioning control device as defined in claim 2 wherein said overrun amount estimation means comprises:
   a first memory device for prestoring amounts of overrun corresponding to various velocities and provides first overrun amount data in response to the detected velocity;
   a second memory device for prestoring amounts of overrun corresponding to various accelerations and provides second overrun amount data in response to the detected acceleration; and
   an operation circuit for determining the estimated amount of overrun by a predetermined operation employing said first and second overrun amount data.

5. A positioning control device as defined in claim 4 wherein said operation circuit obtains the estimated overrun amount by adding or subtracting the first and second overrun amount data at a predetermined ratio in accordance with the target value set by said setting means.

6. A positioning control device as defined in claim 1 which further comprises:
   means for detecting an error of an actual stop position of said motor relative to the target value each time the positioning control has been completed;
   memory means for storing offset data associated with the detected error; and
   data value correction means provided in one or more of signal paths including said overrun amount estimation means, compensation means and comparison means,
   the offset data stored in said memory means being read out during a next positioning control and used as a correction parameter in said data value correction means to correct one or more of the estimated overrun amount, position data and target value data in accordance with the offset data.

7. A positioning control device as defined in claim 2 which further comprises:
   judgement means for judging sway in velocity in response to velocity or acceleration detected by said velocity detection means or said acceleration detection means; and
   acceleration control means for changing, when the sway in velocity has been judged to exist by said judgement means, a set acceleration value of the motor in a direction in which the sway will be eliminated.

8. A positioning control device as defined in claim 1 which further comprises deceleration control means for generating a velocity setting signal following a predetermined deceleration pattern as a function of said position data thereby to control the velocity of said motor.

9. A positioning control device as defined in claim 8 wherein said deceleration control means generates, in response to said position data, a velocity setting signal commanding successive decrease in the velocity from a predetermined high speed to a predetermined low speed in a section from a deceleration start position to a low speed start position whereas said deceleration control means generates the velocity setting signal continuously commanding said predetermined low speed in a section from said low speed start position to a stop position.

10. A positioning control device as defined in claim 9 wherein said deceleration start position, said low speed start position, said predetermined high speed and said predetermined low speed are variably settable.

11. A positioning control device as defined in claim 8 which further comprises acceleration control means for generating, when said motor is started, a velocity setting signal which gradually increases to a predetermined highest speed in accordance with a predetermined acceleration pattern thereby to control the velocity of said motor.

12. A positioning control device as defined in claim 1 wherein said position detection means comprises:
- a variable reluctance type rotational position detector exhibiting change in reluctance corresponding to the position of said rotation shaft and generating an electrical output signal which has phase-shifted an electrical angle of a predetermined reference AC signal in response to this reluctance; and
- a conversion circuit measuring phase difference between the output signal of this detector and the reference AC signal and converting the amount of phase shift to rotational position data,
- wherein said velocity detection means employs the position data obtained by said conversion circuit to compute velocity from timewise change in the value of this position data, and
- wherein said acceleration detection means computes acceleration from timewise change in the value of the velocity data obtained by said velocity detection means.

13. A positioning control device for an electric motor comprising:
- position detection means for detecting a rotational position of said motor;
- setting means for setting a positioning target value;
- control means for supplying a stop command to said motor in accordance with the relationship between position data detected by said position detection means and said positioning target value;
- learning means, operative at each positioning operation of said motor, for detecting and storing an error of an actual stop position of said motor relative to the target value when stopping of said motor has been completed in response to said stop command; and
- correction means, operative at the next positioning operation to a like positioning target value, for correcting a timing for supplying said stop command in said control means in response to the error detected and stored at the previous positioning operation in that target value.

14. A positioning control device as defined in claim 13 wherein said learning means includes:
- means for detecting said error;
- memory means for storing offset data associated with the detected error, said offset data being read out during said next positioning operation; and wherein said correction means corrects one or more of factors determining the timing for supplying said stop command in said control means by using the read out offset data as a parameter.

15. A positioning control device as defined in claim 14 wherein said correction means corrects the value of at least one of the detected position data and the target value data.

16. A positioning control device according to claim 13 wherein there is a brake associated with said motor, wherein said stop command is supplied to said brake, and wherein said correction means effectuates a change in the timing of said stop command by correcting the value of the position data detected by said position detection means.

17. A positioning control device according to claim 16 wherein said learning means comprises:
- a memory storing position offset error values at address locations corresponding to respective position target values,
- means, operative at each subsequent positioning operation to a like positioning target value, for accessing from said memory the previously stored offset error value and utilizing said accessed value to stop the motor, and if the resultant stop position of the motor is error-free, for reentering the same error value into the memory, and if the resultant stop position still has a residual error, for modifying the previous offset error value accordingly and storing instead the resultant modified offset error value at the same storage location.

18. An apparatus for providing at a precise time a stop signal causing braking of a rotating shaft electric motor in order that, after a period of deacceleration, the shaft of the motor may stop rotation at a position closely proximate to a target stop position received by the apparatus, the apparatus comprising:
- means for detecting a current rotational position of the rotating shaft of the motor;
- storage means, receiving the target stop position, for supplying a correction to the target stop position;
- control means, receiving the target stop position and also receiving the correction to the target stop position from the storage means and also receiving the rotational position from the means for detecting, for supplying at a precise time a stop signal causing braking of the rotating shaft electric motor until, after a period of deacceleration, the shaft of the motor does stop; and
- learning means, receiving the target stop position and also receiving the rotational position of the shaft of the stopped motor from the means for detecting, for computing a revised correction in respect of both the target stop position and the rotational position and for storing the revised correction within the storage means as the correction to a subsequent same target stop position.

19. In a learning, adaptive, positioning control system for rotational positional control of an electric motor having
- position detection means for detecting a rotational position of the motor;
- directive means for supplying positioning target values;
- memory means for storing offset values respectively associated with the positioning target values;
- positioning control means, responsive to the positioning target value received from the directive means and to an associated corrective offset value received from the memory means, for stopping the motor at a rotational position proximate to each positioning target value; and
- adaptive learning means, responsive to the rotational position received from the position detection means and to each positioning target value, for providing after each stopping of the motor a correction to that offset value stored in the memory means which was contributory, by action of the positioning control means, to the rotational position assumed by the motor upon each stopping; an improvement comprising:

the correction provided by the adaptive learning means to the offset value is of a magnitude within a limited range, the maximum magnitude correction within the limited range being less than a maximum offset value stored within the memory means.

20. The improvement to a learning positioning control system of claim 19 further comprising:

the minimum magnitude correction within the limited range is greater than the minimum non-zero offset value stored within the memory means.

21. A positioning control device for an electric motor comprising:

position detection means for detecting a rotational position of said motor;

velocity detection means for detecting the velocity of rotation of said motor;

setting means for setting a positioning target value;

overrun amount estimation means for determining an estimated amount of overrun by employing the detected velocity;

compensation means for modifying at least one of the value of position data obtained by said position detection means and the positioning target value in accordance with the estimated amount of overrun determined by said estimation means;

control means for supplying a stop command to said motor in accordance with the relationship between the position data and the target value after the modification by said compensation means; and learning means for detecting an error of an actual stop position of said motor relative to the target value when positioning for stopping said motor has been completed in response to said stop command and correcting a timing for supplying said stop command in said control means in response to the detected error.

* * * * *